US010986855B1

United States Patent
Codispoti et al.

(10) Patent No.: US 10,986,855 B1
(45) Date of Patent: Apr. 27, 2021

(54) POPCORN POPPING AND DISPENSING APPARATUS

(71) Applicants: Anthony V. Codispoti, Columbus, OH (US); John Stump, Santa Barbara, CA (US)

(72) Inventors: Anthony V. Codispoti, Columbus, OH (US); John Stump, Santa Barbara, CA (US)

( * ) Notice: Subject to any disclaimer, the term of this patent is extended or adjusted under 35 U.S.C. 154(b) by 273 days.

(21) Appl. No.: 15/817,028

(22) Filed: Nov. 17, 2017

Related U.S. Application Data

(60) Provisional application No. 62/423,365, filed on Nov. 17, 2016.

(51) Int. Cl.
  *A23L 7/187* (2016.01)
(52) U.S. Cl.
  CPC .......... *A23L 7/187* (2016.08); *A23V 2002/00* (2013.01)
(58) Field of Classification Search
  CPC .......... A23L 7/161; A23L 7/165; A23L 7/178; A23L 7/183; A23L 7/187; A23L 7/191; A23V 2002/00; B65D 81/34; B65D 2581/34; B65D 2581/3421
  USPC .......................................... 99/323.3–323.11
  See application file for complete search history.

(56) References Cited

U.S. PATENT DOCUMENTS

| | | | | |
|---|---|---|---|---|
| 3,714,888 A | * | 2/1973 | Tanguy | A47J 37/044 99/355 |
| 4,306,802 A | * | 12/1981 | Kucera | G03G 15/6502 219/216 |
| 4,417,505 A | * | 11/1983 | Pietrobelli | G07F 9/105 99/323.6 |
| 5,272,961 A | * | 12/1993 | Campbell | A47J 37/1228 99/353 |
| 5,309,825 A | * | 5/1994 | Pinone | G07F 17/0078 99/323.6 |
| 6,187,353 B1 | * | 2/2001 | Wyman | G07F 17/0078 426/233 |
| 7,721,643 B2 | * | 5/2010 | Berger | A23L 7/187 99/323.5 |
| 8,276,504 B2 | * | 10/2012 | Korin | A23L 7/191 34/583 |
| 10,349,668 B2 | * | 7/2019 | Reischmann | A23L 7/187 |

* cited by examiner

*Primary Examiner* — Sarang Afzali
(74) *Attorney, Agent, or Firm* — Patent Service Associates, Inc.; Lyman Smith

(57) ABSTRACT

A popcorn kernel popping machine permits a user to insert a popcorn kernel/flavor pod therein and obtain an evenly flavored popcorn product. The popcorn pod can include not only the popcorn kernels, but also liquid and/or solid flavorings which can be distributed to the popped kernels as they exit the popper, thereby coating the popped kernels evenly with the desired flavoring(s). In some embodiments, a popped kernel collection container can be rotated to evenly collect the popped kernels therein during operation of the popcorn popper.

12 Claims, 16 Drawing Sheets

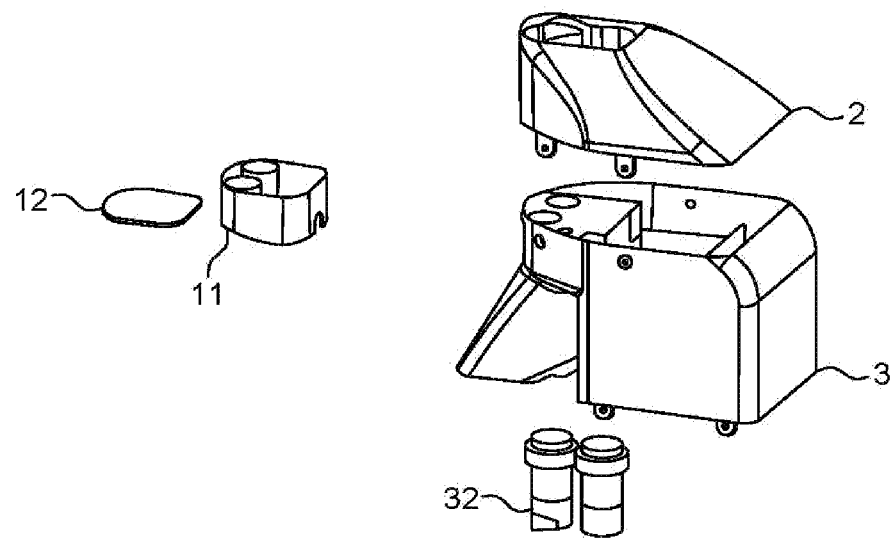
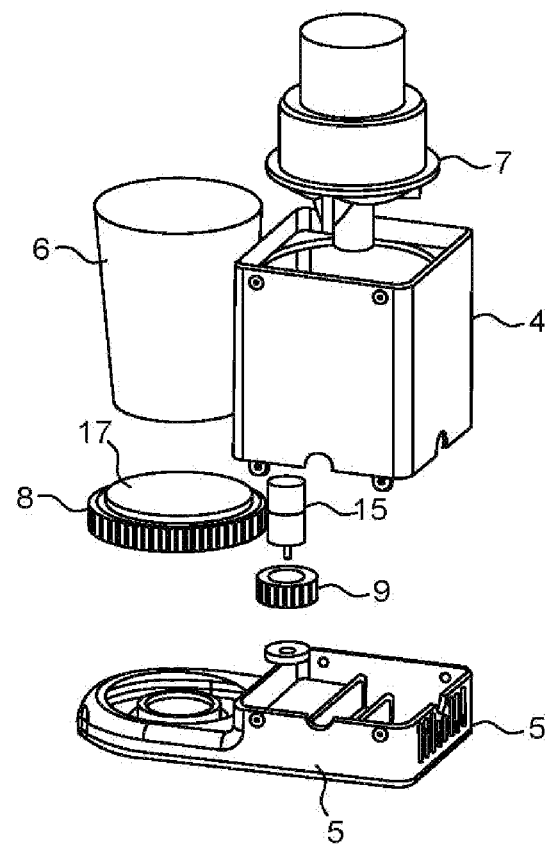
FIG. 1

POPCORN POPPING AND DISPENSING APPARATUS

CROSS-REFERENCE TO RELATED APPLICATIONS

This application claims the benefit of priority to U.S. provisional patent application No. 62/423,365, filed Nov. 17, 2016, the contents of which are herein incorporated by reference.

BACKGROUND OF THE INVENTION

1. Field of the Invention

One or more embodiments of the invention relates generally to small appliances. More particularly, the invention relates to a popcorn popping device that receives a popcorn kernel pod, which includes user selected flavorings, where the user can select their desired popcorn type and/or flavor, insert the selected popcorn pod into the popper and obtain a serving of popcorn.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Popcorn is a favorite snack of many people. Various devices have been taken to market to provide users with fresh, flavored popcorn. These devices often require a user to add popcorn kernels to a popcorn popper, pop the corn, and add flavoring to the popped corn.

For user convenience, manufacturers have developed popcorn kernel containers that include both the popcorn kernels and a liquid or solid flavoring, such as butter and/or salt, for example. These packages may be disposed into a popcorn popper for generating popcorn. Often, these packages require the user to cut open the packaging and manually transfer the contents to the popcorn popper. This may require pre-warming the product (in the case where popcorn popping oil is provided in the packaging) and may be cumbersome and messy for the user.

In addition, the flavorings are often limited and many manufacturers only make a single flavor, where additional flavorings must be added by the user manually, typically after the popcorn has popped. By adding flavoring in this manner, it is often difficult to evenly coat the popped popcorn kernels, resulting in some popcorn being heavily flavored, and some popcorn having minimal, if any, of the desired added flavoring.

In the beverage field, single use coffee machines have become popular. With these machines, a user can select a specific type of coffee from a plurality of commercially available coffee pods. The user simply places the pod into the machine and out comes their desired coffee. Such machines are available for various beverages, however, no such single-use pod device exists for the preparation of edible food products.

As can be seen, there is a need for an improved popcorn popping device that can overcome many of the deficiencies of conventional apparatus.

SUMMARY OF THE INVENTION

Embodiments of the present invention provide a popcorn popper comprising a popcorn popping chamber; a heater to apply heat to the popcorn popping chamber; a popcorn pod fitting into the popcorn popper, the popcorn pod including popcorn kernels; and a popcorn kernel release means for releasing popcorn kernels into the popcorn popping chamber upon insertion of the popcorn pod into the popcorn popper.

Embodiments of the present invention further provide a popcorn popper comprising a popcorn popping chamber; a heater to apply heat to the popcorn popping chamber; a popcorn pod fitting into the popcorn popper, the popcorn pod including popcorn kernels; one or more flavor chambers operable to distribute liquid flavoring onto popped popcorn kernels; one or more spice chambers operable to distribute solid seasoning onto popped popcorn kernels; and a popcorn kernel release means for releasing popcorn kernels into the popcorn popping chamber upon insertion of the popcorn pod into the popcorn popper.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

FIG. 1 is an exploded view of a popcorn popping device according to an exemplary embodiment of the present invention;

Figure 2:
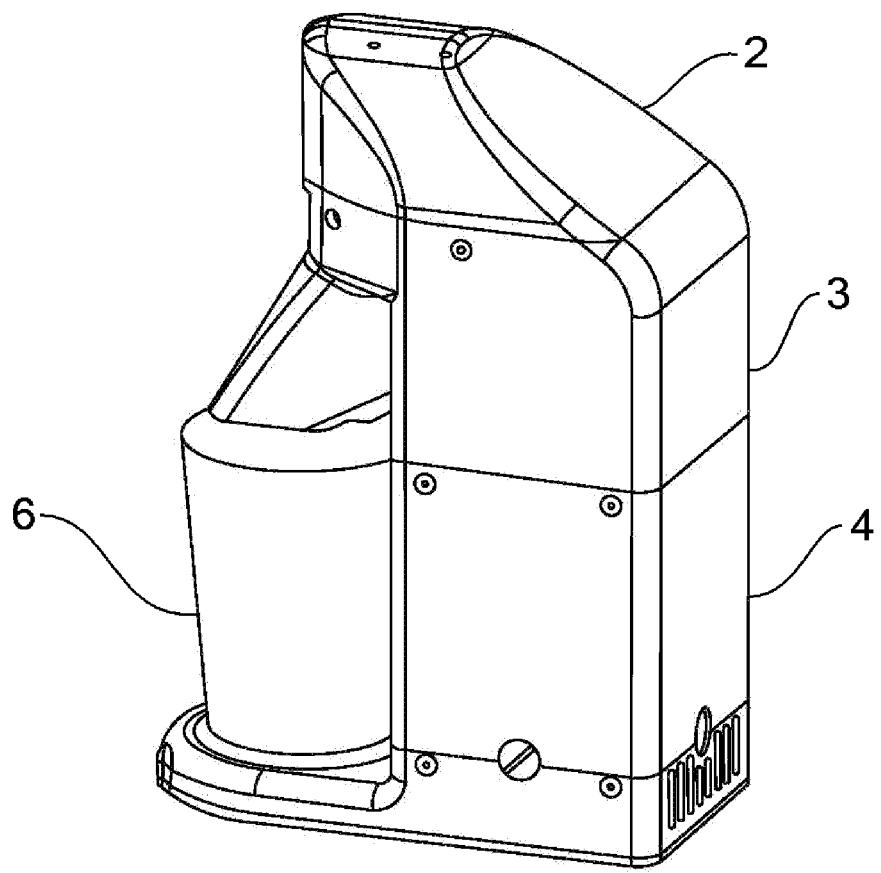
FIG. 2 is an assembled view of the popcorn popping device of FIG. 1.

Unless otherwise indicated illustrations in the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

As is well known to those skilled in the art, many careful considerations and compromises typically must be made when designing for the optimal configuration of a commercial implementation of any system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Broadly, an embodiment of the present invention provides a popcorn kernel popping machine that a user can insert a popcorn kernel/flavor pod therein and obtain an evenly flavored popcorn product. The popcorn pod can include not only the popcorn kernels, but also liquid and/or solid flavorings which can be distributed to the popped kernels as they exit the popper, thereby coating the popped kernels evenly with the desired flavoring(s). In some embodiments, a popped kernel collection container can be rotated to evenly collect the popped kernels therein during operation of the popcorn popper.

Referring to FIG. 1, there is shown a partially exploded view of the popcorn kernel popping machine (also simply referred to as a popcorn popper) according to an exemplary embodiment of the present invention. A turntable housing 5 may act as the base of the unit, where a motor 15 may be used, via a drive gear 9, to drive a turntable gear 8, where a container 6 may rest upon a top surface thereof. Thus, when the motor 15 turns, the container 6, which received the popped popcorn kernels, may rotate. The speed of rotation, the direction of rotation and the timing of the rotation may be optimized depending on the particular application. In some embodiments, the container 6 may be fitted, such as via a friction fit, onto the top surface of the turntable gear 8. In other embodiments, the container 6 may simply rest atop the top surface. In either case, the user may easily remove the container 6 to enjoy flavored popcorn once the popping has stopped.

A popper housing 4 may attach to the turntable housing 5 and may contain a cyclic blower 7 therein. The cyclic blower 7 may provide the necessary heated air for popping popcorn kernels. The cyclic blower 7 may also be referred to as the popping chamber, as in the cyclic blower 7, the kernels are popped when heat is applied via heated air, heated oil, or the like. As the kernels pop, the cyclic blower 7 may expel the popped kernels out and, via the housing 2, 3, to the container 6. In some embodiments, the container itself may be heated and the popcorn kernels may be popped by hot oil delivered to and heated in the chamber of the cyclic blower. In other embodiments, both a heated oil and the cyclic blower 7 may be used for popping the popcorn kernels. When heated oil is used in the popping chamber, in some embodiments, a stir bar may be disposed near the bottom of the popping chamber to stir the kernels in the oil to prevent scalding or burning thereof.

A popcorn/flavor pod 11 (also referred to as flavor cartridge 11) can contain popcorn kernels, one or more separate liquid sauce/flavor chambers (two such chambers are shown in the Example provided in the Figures), and a dry spice chamber. A sealed unit provides freshness for the pod 11. In some embodiments, the pod 11 may be made from 100% compostable and/or recyclable materials. A slicing bottom lid 12 can seal all the chambers airtight. In some embodiments, one of the liquid sauce/flavor chambers may be a popping oil that is delivered to the container initially to permit popping of the kernels as the oil is heated.

In operation, a motor drive system can push plunger rods, for example, into the pod cylinders to push out and dispense two separately sealed cylinders to allow the application of two different flavors such as butter and olive oil. In some embodiments, a single motor can be used to drive both flavor chambers. Typically, each flavor chamber is from about 0.3 to about 0.5 fluid ounces.

The delivery of the liquid flavor can be controlled by a micro processor which receives signals from proximity sensors which are used detect to the motion of the popcorn. In some embodiments, a proximity sensor can be mounted to the device such it can detect the movement of popcorn traveling from the heat barrel (cyclic blower 7) into the container 6. When the proximity sensor detects motion, it sends a signal to the microprocessor, then logic control algorithms control the timing and sequence of the motor control such the liquid flavoring is dispensed to time out with the flow of the popcorn as it travels into the container. This control system prevents the fluid from being dispensed into an empty container.

Motorized dry spice dispensing, similar to the liquid flavor, does not start until triggered by the proximity sensor. A motor drive system can engage from the machine into the pod by use of a socket or spline drive system, for example. This allows the pod to enter the machine fast, easy, and with no fuss. As the pod is pushed in, the spicer drive socket connects and provides a robust torque drive connection. As the motor turns, the spice shaft spins. The end opposite the drive connection has an array of cavities sized to fill and dispense as it is rotated thru 360-degree rotation. These holes can vary in size to accommodate different types of dry spice. For example, fine powder turmeric requires higher quantity of smaller cavities while larger grain size spice, such as rosemary leaves, require larger particle size dispensed on the corn.

To use the popcorn popper, main power to the machine is activated. This may happen, for example, automatically as the pod is pushed in. When the pod is inserted, it can dump kernels into the popper on its own. At this point, the popper can turn on. Full insertion of the pod should trigger the popper to start heating the kernels. System should ensure full insertion/intent to pop prior to initiation of the popper, possibly requiring the pod to stay fully inserted for 1-3 seconds before popper activation, for example. This can help avoid unintended activations by, for example, partial insertion and the user changes flavor choice and pulls it out. If the cartridge is removed at any time, the machine should stop all processes and enter standby. If cartridge is reinserted in a given time frame, the machine will pick up where it left off, otherwise it will go into a hazard mode and indicate kernels must be removed prior to a new cycle. Cartridge identification or kernel dump detect may be used to avoid double kernels and popcorn container overflow. 'Container detect' may be used to help avoid a mess. Cartridge removal may not be possible once liquid dispense is initiated, as the plunger drivers block removal.

Next, power is provided to the electric heater blower system and/or container heating system. In some embodiments, a timer may be used to delay activation of the proximity sensor. For example, the proximity sensor may not be engaged until about 30-90 seconds has passed, as popcorn will not pop prior to this time period. This prevents inadvertent detection of popcorn being popped and premature engagement of liquid and/or solid flavoring delivery.

Next, initial popcorn is detected between 70-90 seconds, for example. When proximity sensor detects motion, a signal sent to the micro-processor, which signals to activate container rotation, fluid dispensing, and dry spice dispensing. In some embodiments, all three motors stay on until the proximity sensor detects no motion for a predetermined period of time, such as about 10 seconds. Before power is shut down, the fluid plungers retract to be ready for the next pod. In some embodiments, popping oil fluid dispensing may occur immediately, while flavor fluid dispensing may not start until popping of kernels is detected.

The popper may sense first pop and/or kernel/popped kernel ejection. The timer may be started to run liquid dispense, spice dispense, and turntable programs. Un-popped kernels and popped kernels both get ejected during this phase. Programming should take into account the different sensor responses to the possible outcomes and the time between first pop or kernel ejection and when liquid and spice should ideally be initiated.

Popcorn continues to pop and exit the machine and fall into the container. Liquid and spice are dispensed to top outflowing popcorn with the use of the turntable to assist in even distribution. In some embodiments, the running of the liquid/spice/turntable can be empirically tuned and timed by a program or may sense popping progress and 'actively' adjust liquid/spice/turntable speeds/directions to respond to sensed inputs. Programs should ensure that the liquid and spice are effectively applied with even distribution and all contents, unless flavor level adjustment is turned down. Programs needs to avoid dispensing too much or too little early and too much or too little at the end. Even distribution during popping with a little bonus topping on the top of the popcorn after the end of the popping cycle may be considered ideal.

When popping is complete and the vast majority of popcorn is ejected, the popper turns off, the liquid/spice/turntable finishes its program to 'top off' the finished product with a little extra topping and the machine shuts all flavoring functions off when finished. The popper may sense end of popping stage, turn off popper, run finishing program for liquid, spice, and turntable. Again, even distribution during popping with a little bonus topping on the top of the popcorn after the end of the popping cycle may be considered as ideal. Creative programming can ensure a given volume is left at the end for this purpose. If user-interface flavor level inputs are used, leftover toppings in the cartridge may be acceptable, even after the finishing program. A limit switch or position detector may be used for liquid dispense mechanism to prevent crashing and breakage when the end of dispense stroke is reached. Liquid dispense driver can be rewound or reset in order to remove spent cartridge and start another use cycle.

When all flavoring processes are finished, machine indicates the process is complete. Product can be removed by user and enjoyed. When finishing program for liquid, spice, and turntable are complete, the system indicates audibly or visually that the product is done and begins to reset liquid dispense drivers. Obvious visual or audible output should clearly indicate to the user that they should take their finished popcorn. Once liquid dispense mechanism is reset and sensed, cartridge removal readiness indicator will also activate for the user. 'Container detect' may be used to ensure the user has taken their finished product.

Typically, no clean-up is required between pod batches, however the user may choose to open an access panel in the main housing to allow un-popped kernels to be removed, cleaned and or wipe out dust and debris.

After liquid dispense reset and cartridge removal readiness is indicated, the spent cartridge can be removed. The machine can turn off and be prepared for the next user activation via cartridge insertion. Some safety may be desirable to avoid unintended reactivation during the cartridge removal, i.e., a delay between cartridge removal and the next allowable activation of 5 seconds. The shut down program can differ depending on use of container detect. A limit switch or position detect can be used for the liquid dispense driver mechanism to reset and avoid crashing and breakage. Voltage increase to maximum allowable voltage can be used for the liquid dispense motor to speed the mechanism reset and reduce time between product readiness and cartridge removal readiness. This will ready the machine for another user much faster than using a lower voltage that may be more ideal for dispensing.

Figure 2A:
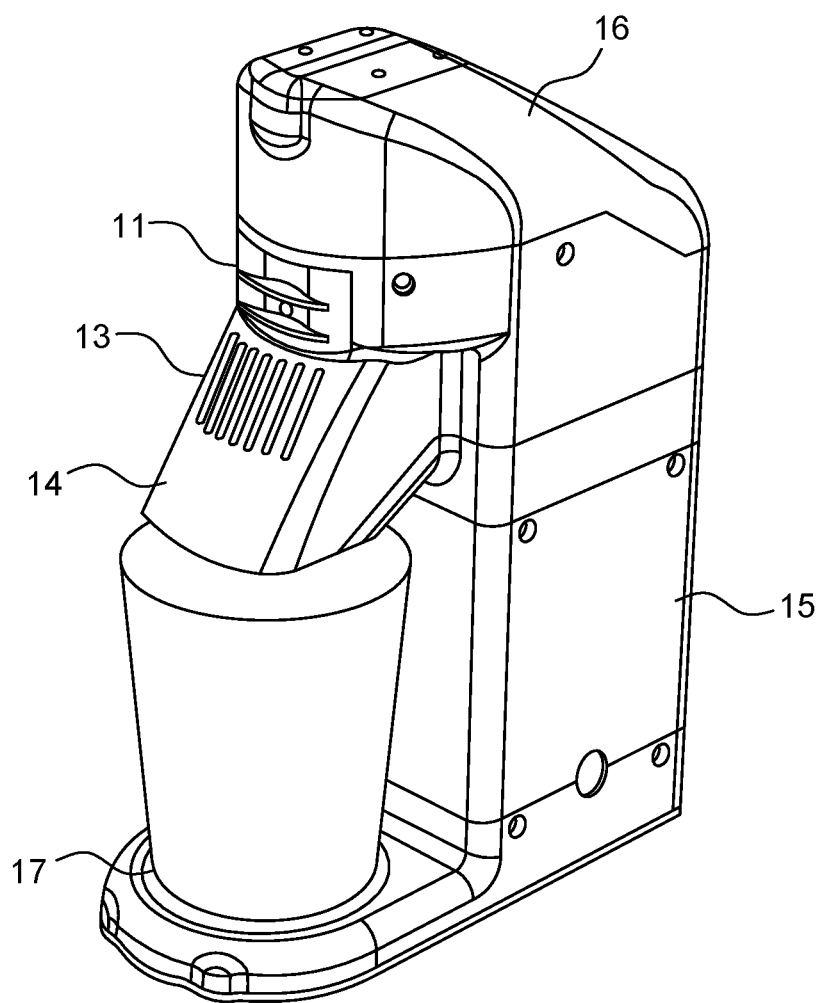
FIG. 2A is another assembled view of the popcorn popping device of FIG. 1.

FIGS. 2 and 2A show the assembled popcorn popper according to an embodiment of the present invention. The dispenser 14 can include vents 13 to release steam and hot air during popping. A heater 15 can be used to heat air and/or heat the container for popping the kernels. A clear window 16 can be used to see the popping and help determine the completion of the batch. A turntable 17 may be used to turn the receiving container to allow popped kernels to be evenly delivered to the container.

Figure 3:
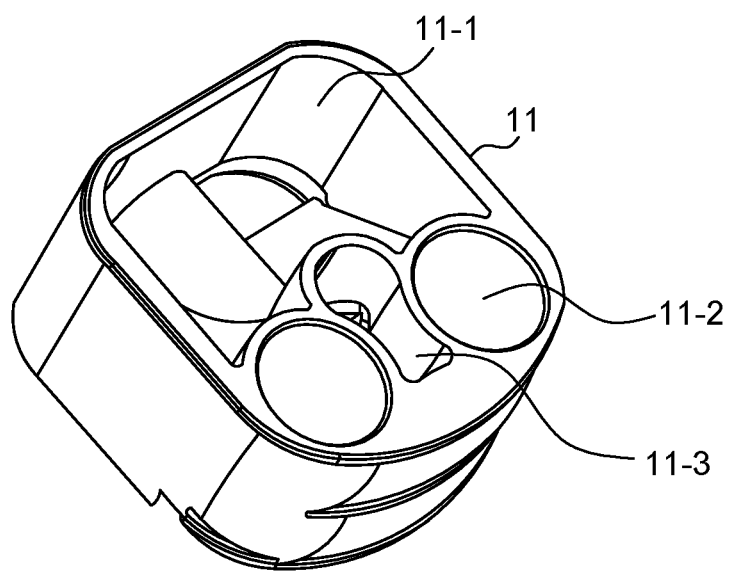
FIGS. 3 and 4 show various views of a popcorn pod usable in the popcorn popping device of FIG. 1.
Figure 4:
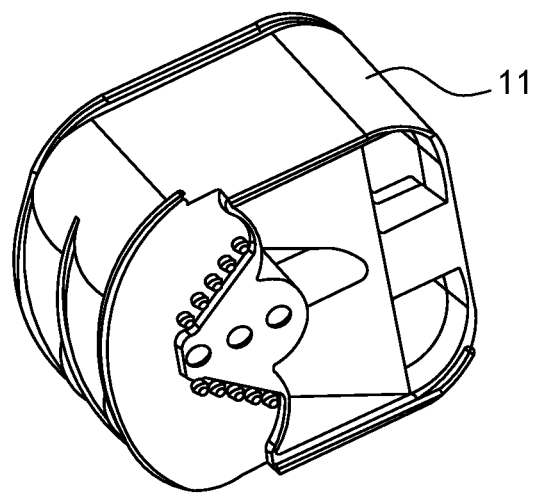

Referring to FIGS. 3 and 4, a pod 11 can include a kernel chamber 11-1, one or more oil/flavor chambers 11-2 (two are shown) and a dry spice chamber 11-3. The popcorn popper can deliver the kernels from the chamber 11-1 and apply heat and/or oil to pop the kernels in the cyclic blower.

Figure 5:
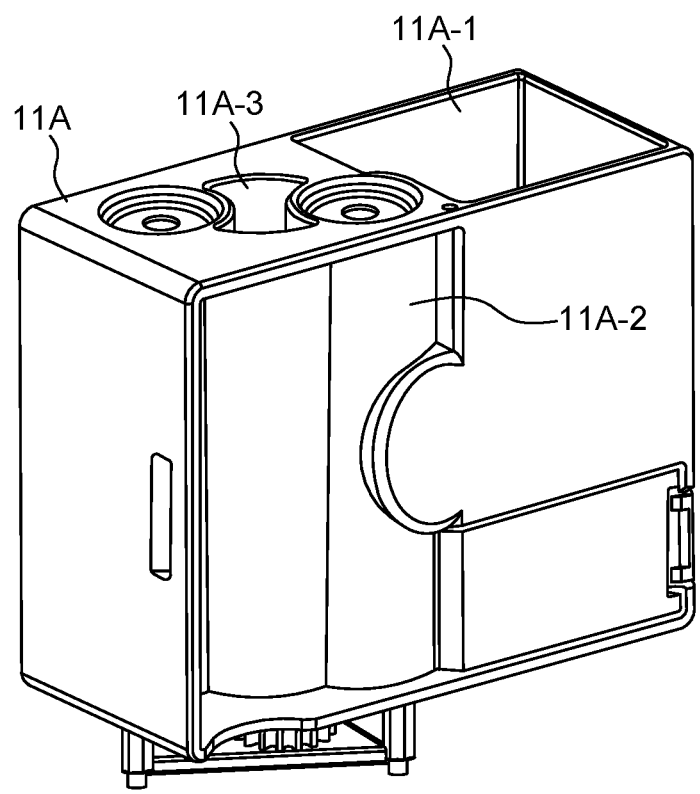
FIG. 5 shows an alternate embodiment of a popcorn pod useable in a popcorn popping device according to an exemplary embodiment of the present invention.
Figure 6:
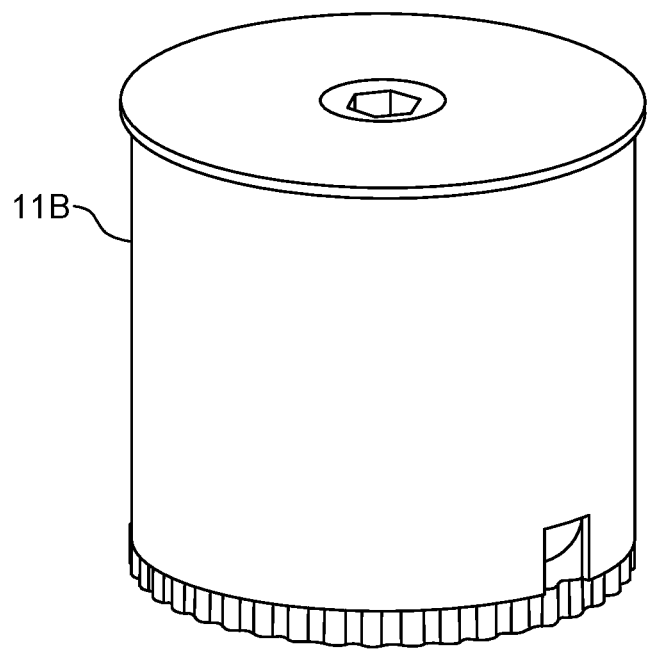
FIG. 6 shows an alternate embodiment of a popcorn pod useable in a popcorn popping device according to an exemplary embodiment of the present invention.
Figure 7:
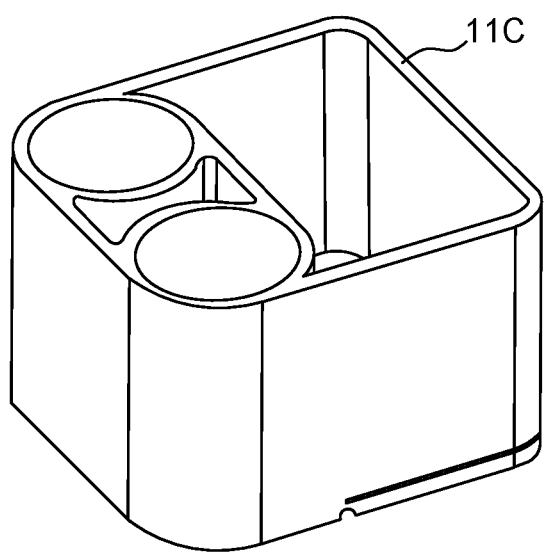
FIG. 7 shows an alternate embodiment of a popcorn pod useable in a popcorn popping device according to an exemplary embodiment of the present invention.
Figure 8:
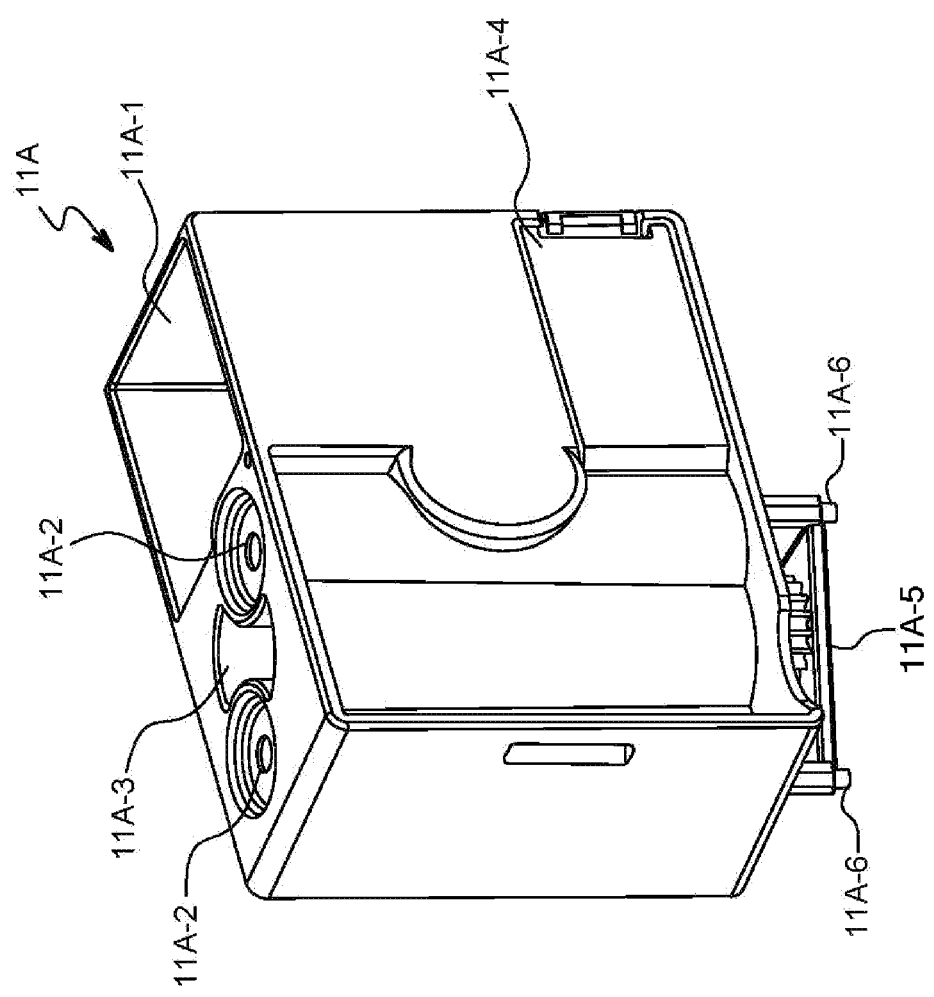
FIG. 8 shows a perspective view of the pod of FIG. 5.
Figure 9:
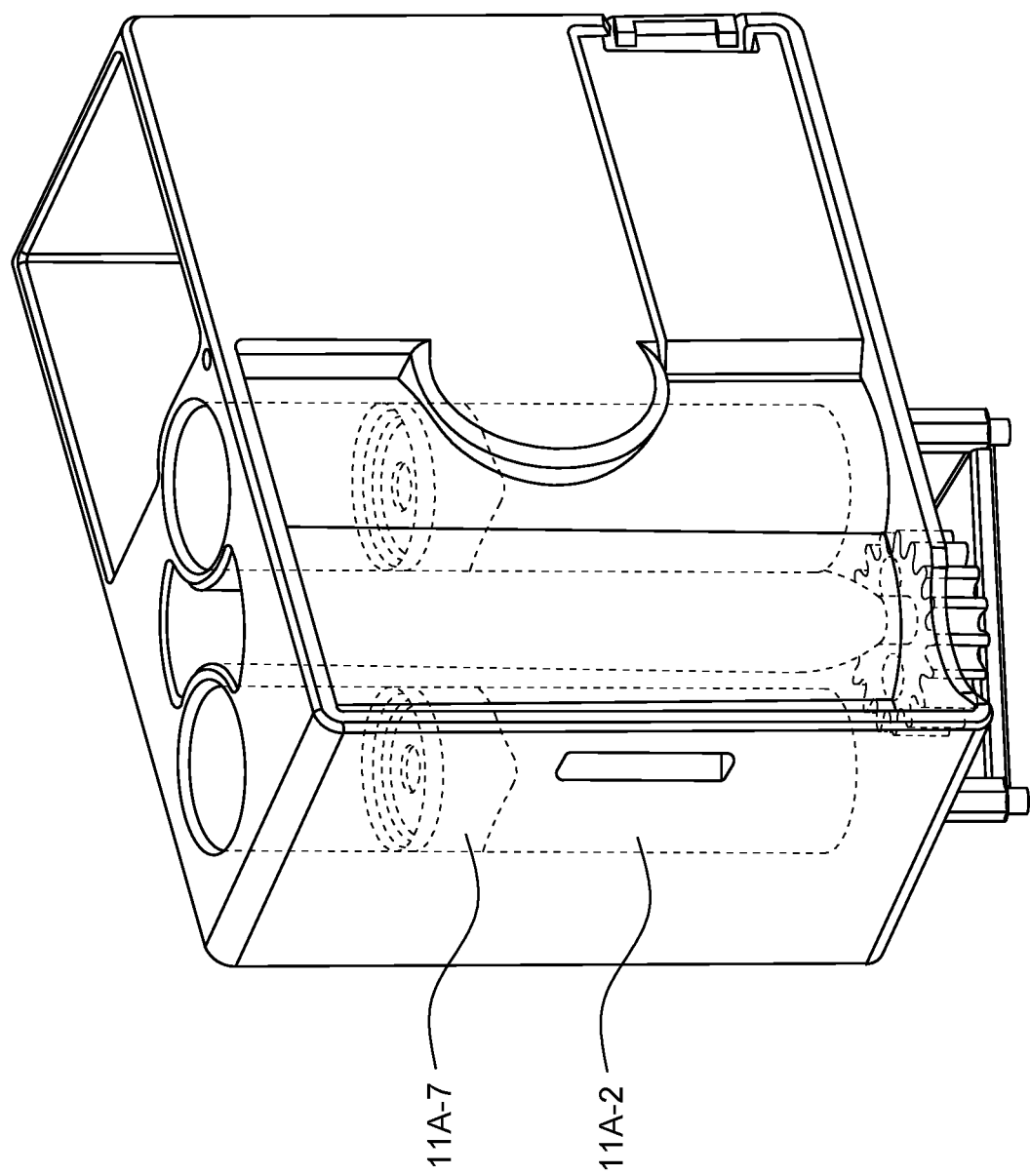
FIG. 9 illustrates liquid injection from the pod of FIG. 5.
Figure 10:
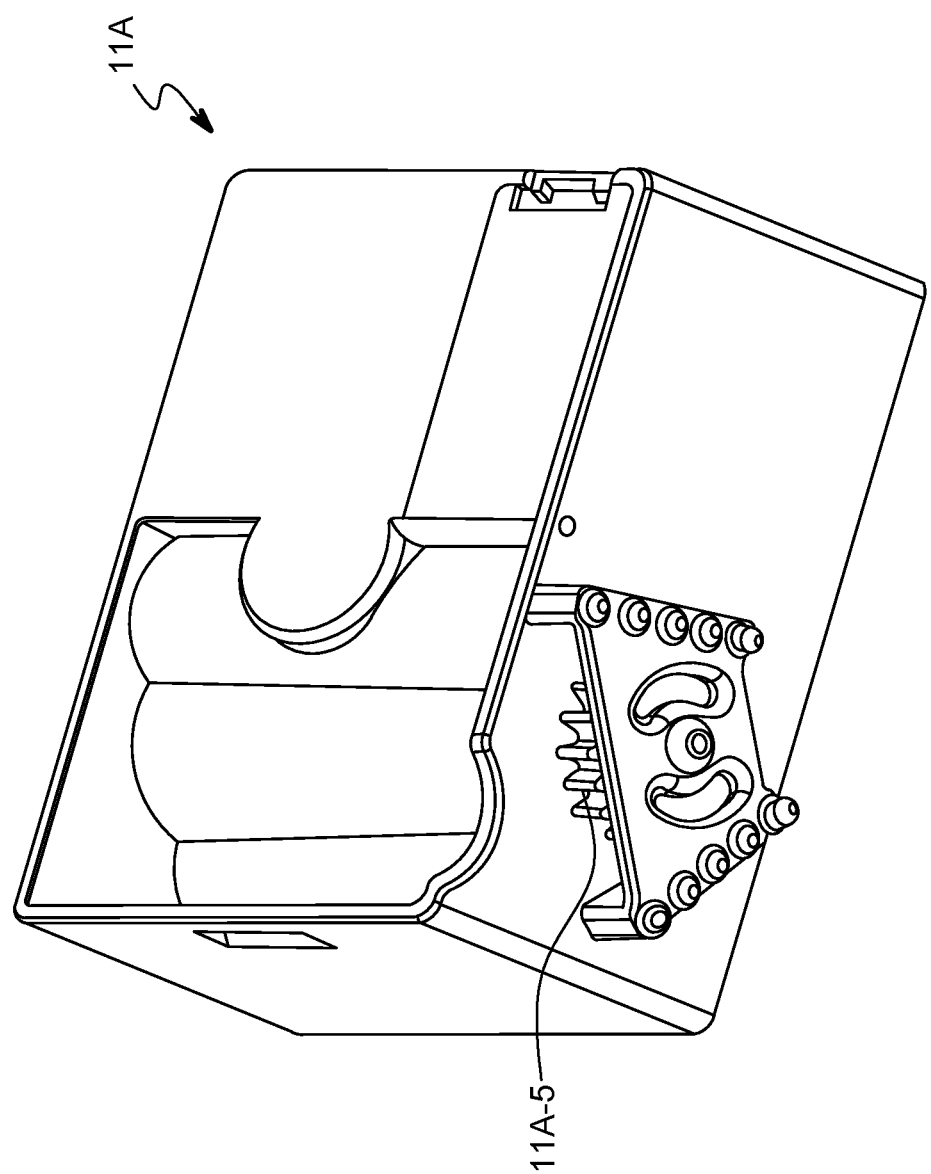
FIGS. 10 and 11 illustrate spicer function of the pod of FIG. 5.
Figure 11:
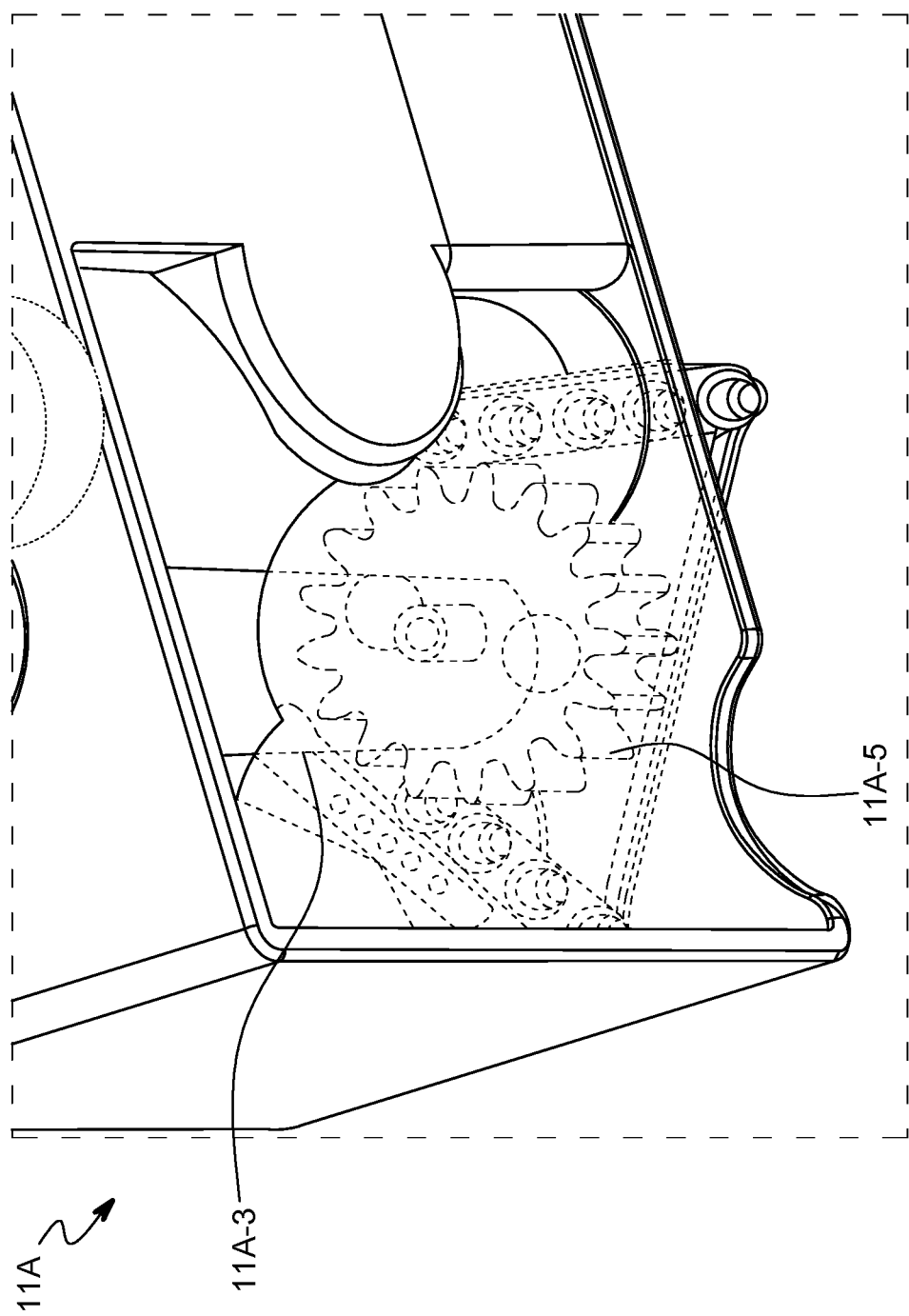

FIGS. 5, 6 and 7 show various other embodiments for pods 11A, 11B, 11C that may be used in the popcorn popper according to embodiments of the present invention. Regardless of design of the pod, the popcorn popper can permit a user to pop a single serving of popcorn in their desired flavor.

FIGS. 8 through 11 show details of the exemplary pod 11A. Similar to the pods described above, pod 11A can include kernel chamber 11A-1, one or more oil/flavor chambers 11A-2 and a spice chamber 11A-3. A door 11A-4 may open to allow kernels from the kernel chamber 11A-1 to be disposed in the popper. A spice gear 11A-5 may turn to dispense spice from the spice chamber 11A-3. Liquid dispensers 11A-6 may be disposed at the bottom of the oil/flavor chambers 11A-2 to allow liquid to exit. A plunger 11A-7 may be depressed to move the liquid from the chamber 11A-2 into the container 6.

Figure 12:
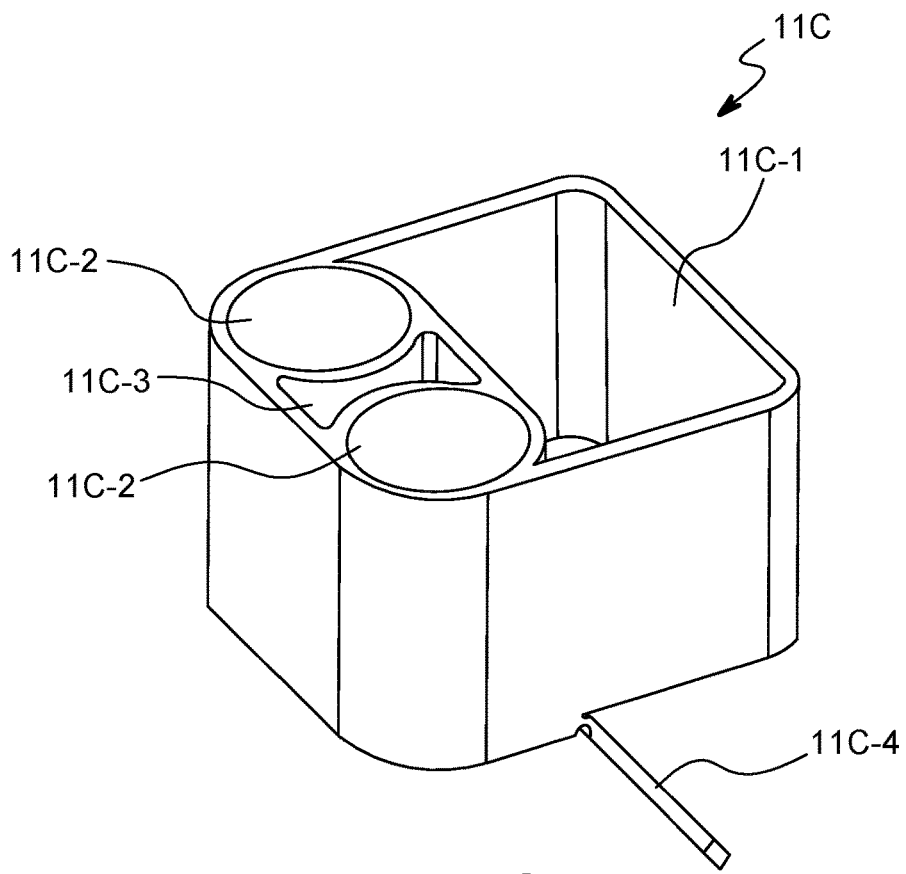
FIG. 12 illustrates the pod of FIG. 7.

FIG. 12 shows details of the exemplary pod 11C. Similar to the pods described above, pod 11C can include kernel chamber 11C-1, one or more oil/flavor chambers 11C-2 and a spice chamber 11C-3. A door 11C-4 may open to allow kernels from the kernel chamber 11C-1 to be disposed in the popper.

Figure 13:
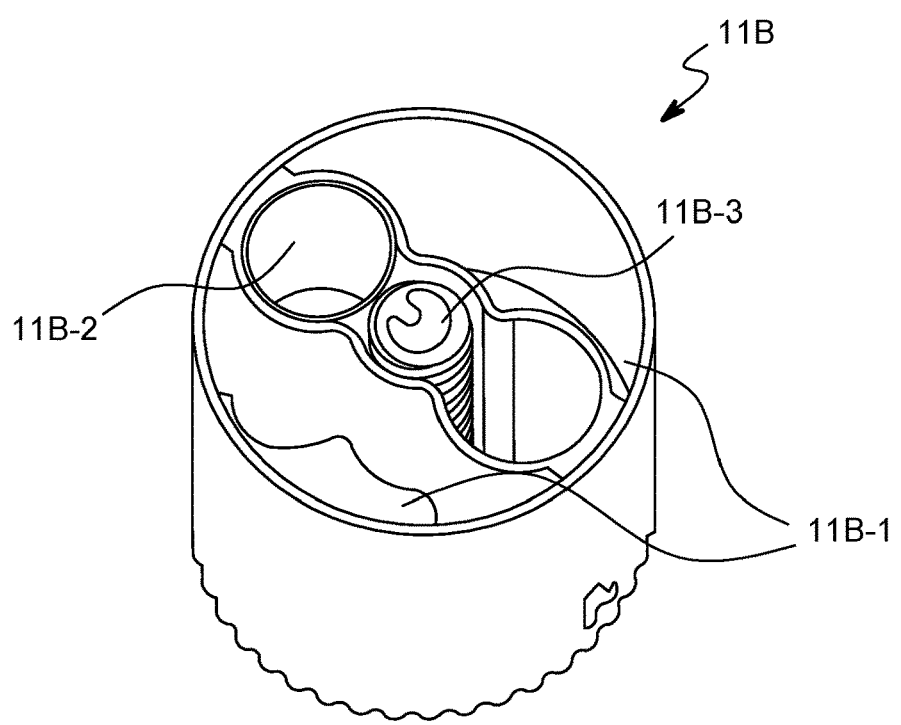
FIGS. 13, 14 and 15 illustrate operation of the pod of FIG. 6.
Figure 14:
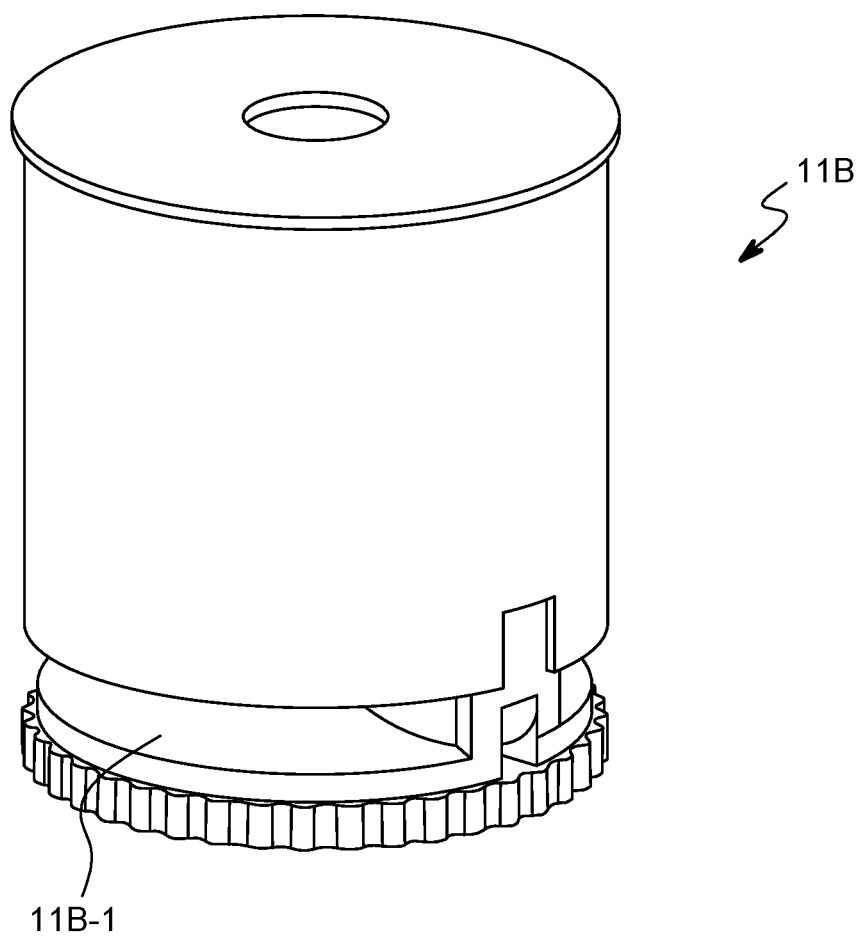
Figure 15:
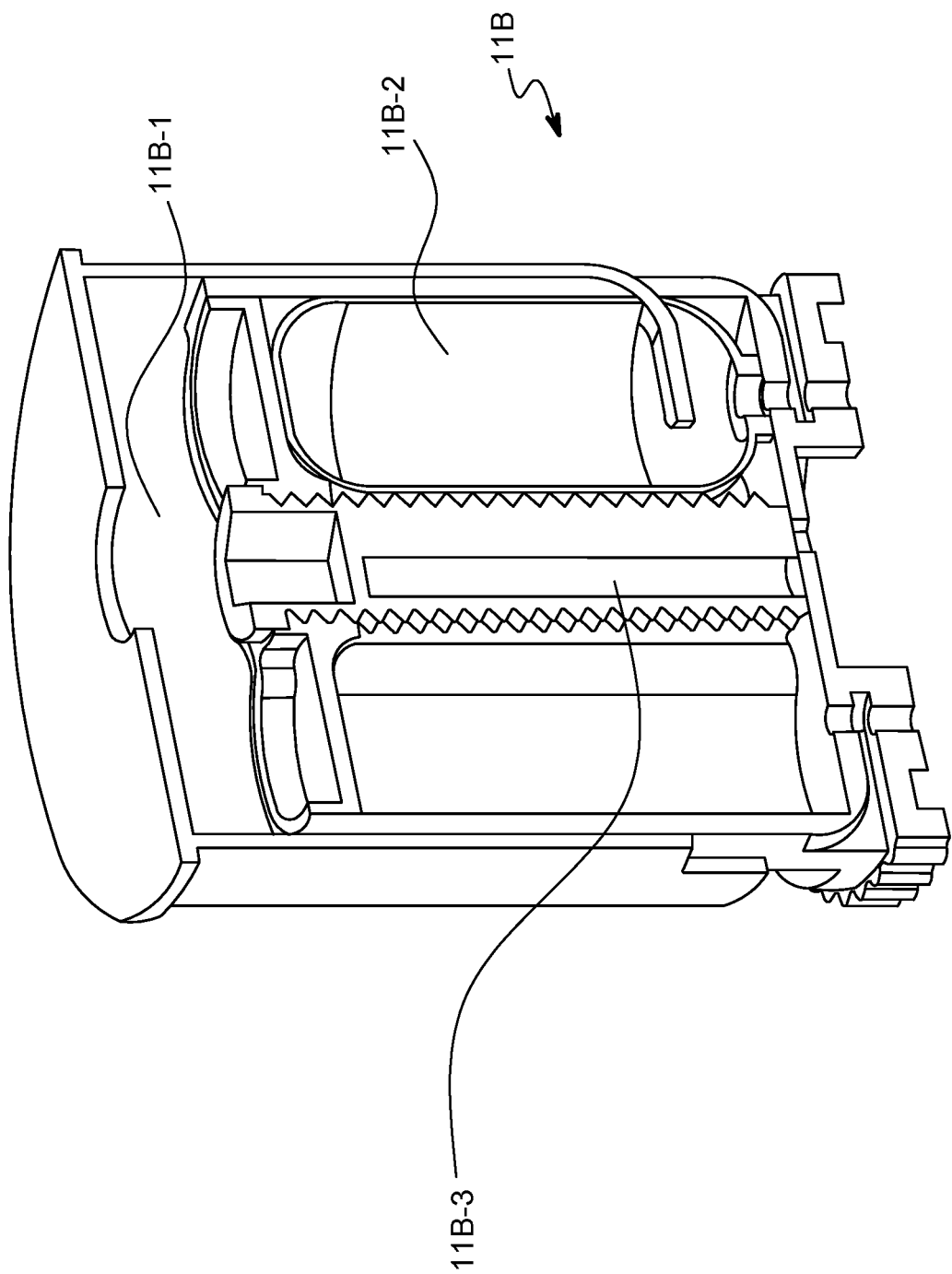

FIGS. 13 through 15 show details of the exemplary pod 11B. Similar to the pods described above, pod 11B can include kernel chamber 11B-1 on each side of the one or more oil/flavor chambers 11B-2, and a spice chamber 11B-3. Sides of the pod 11B may lift to allow kernels from the kernel chamber 11B-1 to be disposed in the popper.

Figure 16:
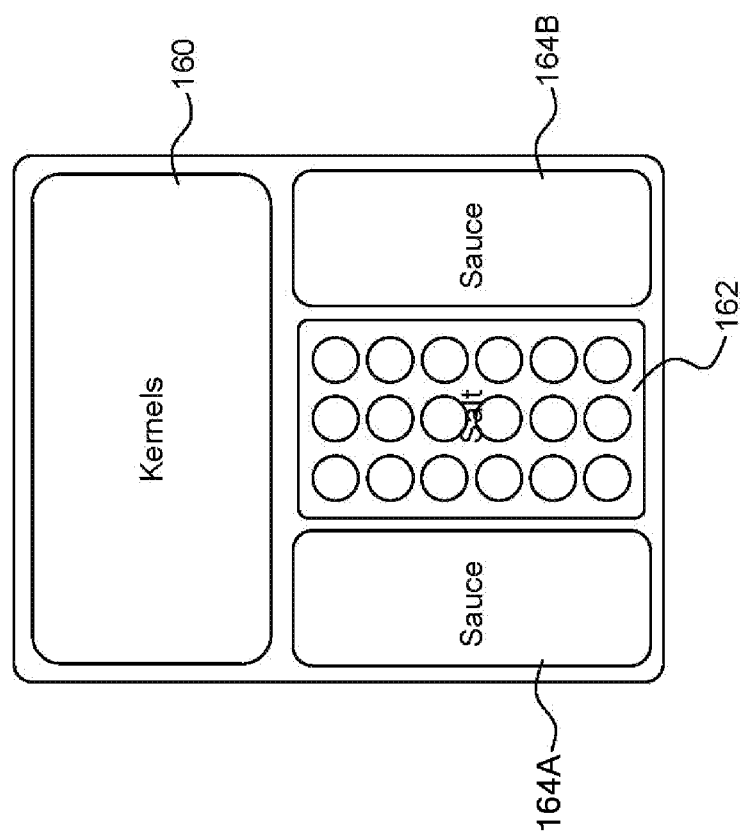
FIGS. 16 and 17 illustrate an alternate embodiment of a popcorn pod usable in a popcorn popping device according to an exemplary embodiment of the present invention.
Figure 17:
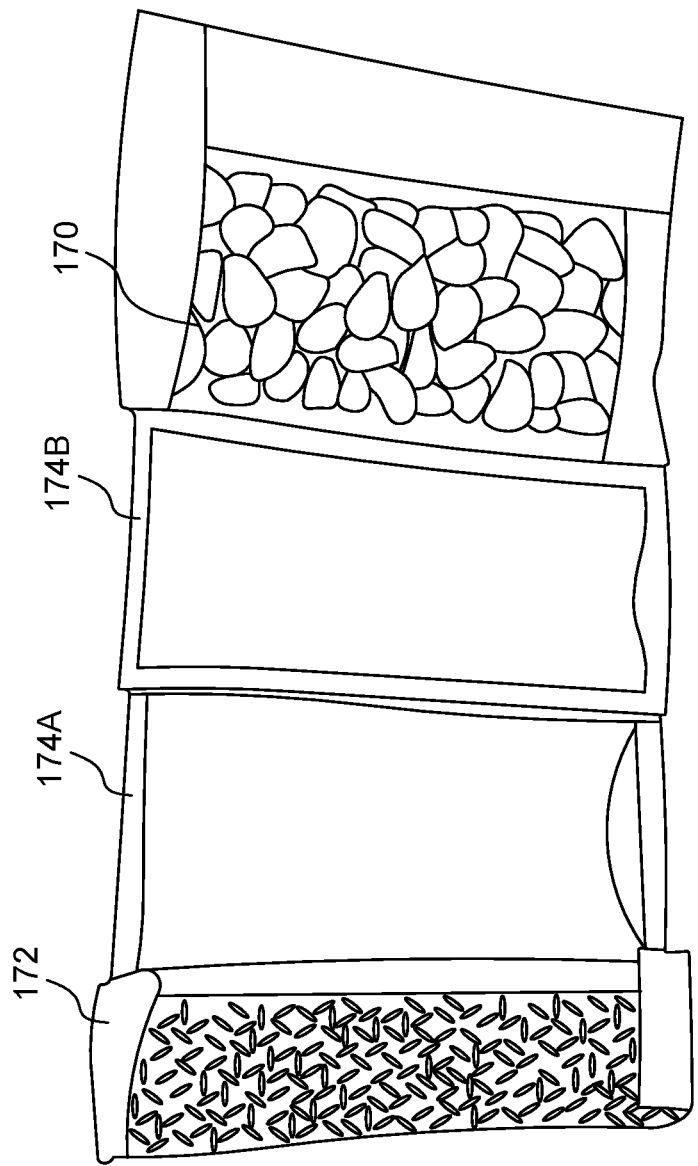

FIGS. 16 and 17 show alternate embodiments of popcorn packaging for application into a popcorn popper according to an exemplary embodiment of the present invention. In FIG. 16, one configuration of popcorn kernels 160, sauce/liquid flavorings 164A, 164B and spice 162, such as salt, may be disposed in a single package. This package, as shown in FIG. 17, may be flexible, recyclable and/or compostable. The package of FIG. 17 can include popcorn kernels 170, sauce/liquid flavorings 174A, 174B and spice 172. The configuration and/or arrangement of the items may vary. The packaging may be disposed into a pod for placement into the popcorn popper. Various mechanisms may be used to properly puncture/open each of the separate containers to appropriately deliver the kernels, sauce/liquid flavorings and spice(s).

Figure 18:
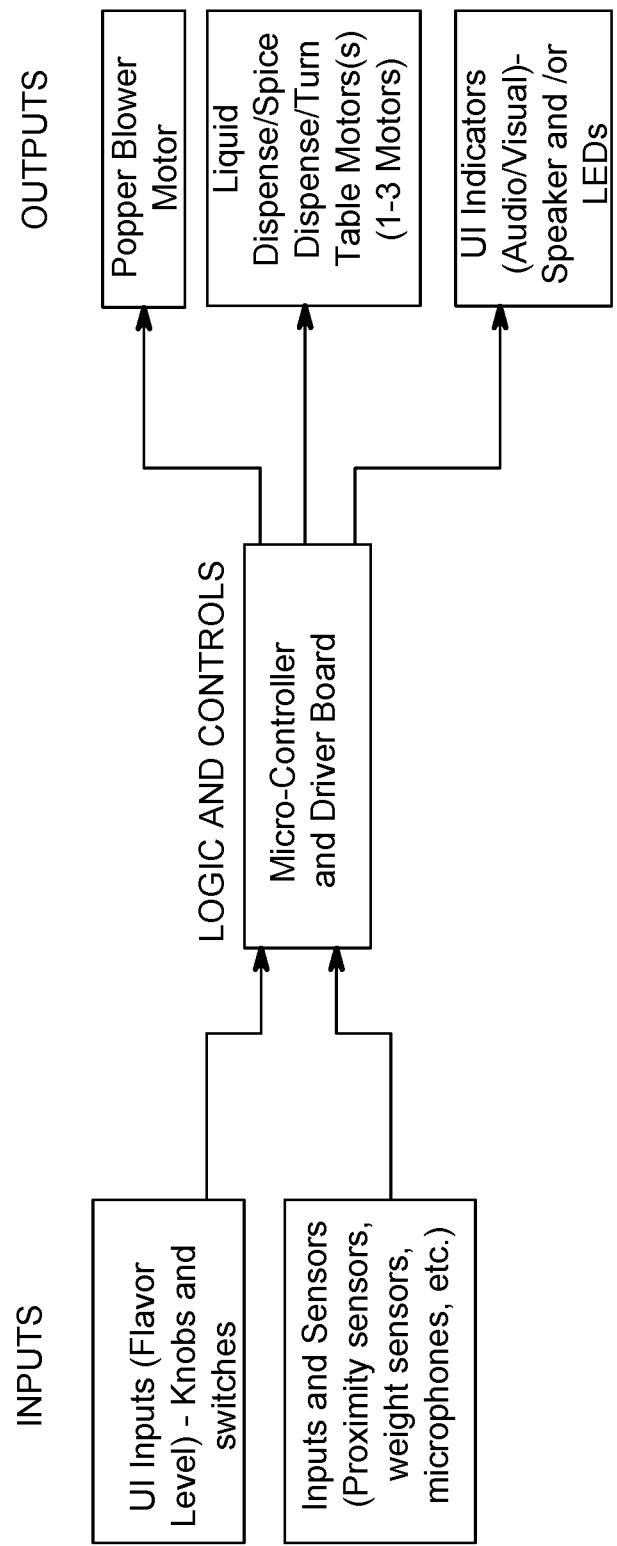
FIG. 18 illustrates an exemplary simplified electrical diagram for the popcorn popper of the present invention.

As illustrated in FIG. 18, various electrical components may be used in the popcorn popper of the present invention. For example, a cartridge detector, such as the micro switch, may be used. Also, the following optional components may be used in the popcorn popper: a cartridge ID reader, a kernel popping detector, a kernel dump detector, a container detect/turntable weight sensor, limit switches or position detector for liquid dispense driver crash protection, a microphone, various user interface (UI) switches and knobs, such as flavor level adjust, various outputs, such as motor outputs, indicators and the like.

The device can operate on standard 110V household AC outlet, for example.

The popcorn popper of the present invention provides several features that differentiate it from conventional popcorn poppers. For example, the apparatus of the present invention provides a consistent flow of popcorn for a more consistent coating by controlling hot airflow of the machine (air flow and temp). Firmware/control logic optimizes coating process and manages power on/off. An internal deflection mechanism can be included that helps keep un-popped kernels in the chamber for more complete kernel popping.

The size of the container may vary, depending on application, but is typically a single-serving container that can hold from about 180 to about 200 pieces of popped popcorn. To achieve the single serving of popcorn, the user simply operates the device in a "one-touch" manner by pushing the pod into the device. The device takes care of the rest by dropping the kernels into the heater, turns on the heater for a period of time, turns on the popped corn detector (proximity detector) and, as the corn pops, liquid flavor and/or dry spice is drizzled over the popped corn in the container, where rotation of the container helps ensure even coating of the popped corn with the flavorings.

The pod can include a unique and novel sliding action cover that is displaced to simultaneously dump kernels and uncork the fluid pathways.

The popcorn popper of the present invention allows for a unique and personalized user experience. Instead of massive bulk large shared family bowl of the same boring flavor, each user gets to experience single serving with unique flavors. The user simply selects a pod, inserts into the machine, and moments later, completely dispensed fresh single serving of hot, fresh, dual liquid flavor, and single spice all packaged perfectly into compostable, disposable container. When the next user wants popcorn, they can insert their pod and the cycle repeats, without the need for extensive cleaning between each user's use of the device.

The flavorings can vary and may include butter, strawberry, sugar, caramel, chocolate, salt, olive oil, coconut butter, Himalayan salt, rosemary, chocolate sauce, kettle corn, as well as other savory flavors. The device can easily focus on regional tastes and can include healthier flavors, such as brewer's yeast, protein powder, vitamins, paleo, gluten free, low sodium, fat free, sugar free, healthy fats and the like. For every flavor or health fad out there, a popcorn pod can be developed that caters to it.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Claim elements and steps herein may have been numbered and/or lettered solely as an aid in readability and understanding. Any such numbering and lettering in itself is not intended to and should not be taken to indicate the ordering of elements and/or steps in the claims.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A popcorn popper comprising:
    a popcorn popping chamber;
    a heater to apply heat to the popcorn popping chamber;
    a popcorn pod fitting into the popcorn popper, the popcorn pod including a single kernel compartment having popcorn kernels;
    a container for receiving popped popcorn from the popcorn popping chamber, the container being removable from the popcorn popper with the popped popcorn therein; and
    a popcorn kernel release means for releasing popcorn kernels from out of the single kernel compartment of the popcorn pod into the popcorn popping chamber, wherein the popcorn popper requires removal of the popcorn pod and insertion of a second popcorn pod into the popcorn popper before popping a further batch of popcorn kernels.

2. The popcorn popper of claim 1, further comprising one or more flavor chambers operable to distribute liquid flavoring onto popped popcorn kernels.

3. The popcorn popper of claim 2, wherein the liquid flavoring is distributed to popped popcorn kernels as they exit the popcorn popping chamber and move into the container.

4. The popcorn popper of claim 1, further comprising a spice chamber operable to distribute solid seasoning onto popped popcorn kernels.

5. The popcorn popper of claim 4, wherein the solid seasoning is distributed to popped popcorn kernels as they exit the popcorn popper.

6. The popcorn popper of claim 1, further comprising a turntable positioned below a popped popcorn exit of the popcorn popper, the turntable operable to turn a container configured to receive the popped popcorn from the exit of the popcorn popper.

7. The popcorn popper of claim 1, further comprising an indicator to show a user when the popcorn pod can be removed and a new one inserted.

8. The popcorn popper of claim 1, wherein insertion of the popcorn pod automatically turns on the popcorn popper.

9. A popcorn popper comprising:
    a popcorn popping chamber;
    a heater to apply heat to the popcorn popping chamber;
    a popcorn pod fitting into the popcorn popper, the popcorn pod including a single kernel compartment having popcorn kernels;
    a container for receiving popped popcorn from the popcorn popping chamber, the container being removable from the popcorn popper with the popped popcorn therein:
    one or more flavor chambers operable to distribute liquid flavoring onto popped popcorn kernels;
    a spice chamber operable to distribute solid seasoning onto popped popcorn kernels; and
    a popcorn kernel release means for releasing popcorn kernels from out of the single kernel compartment of the popcorn pod into the popcorn popping chamber, wherein the popcorn popper requires removal of the popcorn pod and insertion of a second popcorn pod into the popcorn popper before popping a further batch of popcorn kernels.

10. The popcorn popper of claim 9, wherein the liquid flavoring is distributed to popped popcorn kernels as they exit the popcorn popper.

11. The popcorn popper of claim 9, wherein the solid seasoning is distributed to popped popcorn kernels as they exit the popcorn popper.

12. The popcorn popper of claim 9, further comprising a turntable positioned below a popped popcorn exit of the popcorn popper, the turntable operable to turn a container configured to receive the popped popcorn from the exit of the popcorn popper.

* * * * *